(12) United States Patent
Giljam

(10) Patent No.: US 6,482,052 B1
(45) Date of Patent: Nov. 19, 2002

(54) AMPHIBIOUS VEHICLE

(76) Inventor: John J Giljam, P.O. Box 1703, Bluffton, SC (US) 29910

( * ) Notice: Subject to any disclaimer, the term of this patent is extended or adjusted under 35 U.S.C. 154(b) by 0 days.

(21) Appl. No.: 09/840,662

(22) Filed: Aug. 21, 2001

(51) Int. Cl.$^7$ .................................................. B60F 3/00
(52) U.S. Cl. ................................ 440/12.51; 440/12.57
(58) Field of Search ............................ 440/12.5, 12.51, 440/12.57, 12.58, 12.59, 12.6, 12.61; 296/25; 180/291

(56) References Cited

U.S. PATENT DOCUMENTS

| | | | |
|---|---|---|---|
| 1,677,846 A | * | 7/1928 | Powell |
| 2,400,132 A | * | 5/1946 | Porter |
| 3,941,074 A | | 3/1976 | Millerbernd |
| 4,124,124 A | | 11/1978 | Rivet |
| 4,346,915 A | | 8/1982 | Le Blanc |
| D269,079 S | | 5/1983 | Fripp |
| D305,877 S | | 2/1990 | Price, II |
| 4,958,584 A | | 9/1990 | Williamson |
| 5,027,737 A | | 7/1991 | Duffy et al. |
| 5,176,098 A | | 1/1993 | Royle |
| 5,181,478 A | | 1/1993 | Berardi |
| 5,183,423 A | | 2/1993 | Alinari |
| 5,199,372 A | | 4/1993 | Seligman et al. |
| 5,203,274 A | | 4/1993 | Hart et al. |
| 5,231,946 A | | 8/1993 | Giles |
| 5,243,924 A | | 9/1993 | Mann |
| 5,315,950 A | | 5/1994 | Abel |
| 5,392,871 A | | 2/1995 | McFarland |
| 5,400,734 A | | 3/1995 | Doyon |
| 5,410,980 A | | 5/1995 | Wardavoir |
| 5,520,138 A | | 5/1996 | Humphrey |
| 5,531,179 A | | 7/1996 | Roycroft et al. |
| 5,531,652 A | | 7/1996 | Hall et al. |
| 5,562,066 A | | 10/1996 | Gere et al. |
| 5,570,653 A | | 11/1996 | Gere et al. |
| 5,590,617 A | | 1/1997 | Gere et al. |
| 5,687,669 A | | 11/1997 | Engler |
| 5,690,046 A | | 11/1997 | Grzech, Jr. |
| 5,727,494 A | | 3/1998 | Caserta et al. |
| 5,752,862 A | | 5/1998 | Mohler et al. |
| 5,755,173 A | | 5/1998 | Rorabaugh et al. |
| 5,769,021 A | | 6/1998 | Schad |
| 5,795,199 A | | 8/1998 | Langenberg et al. |
| 5,832,856 A | | 11/1998 | Giles |
| 5,832,862 A | | 11/1998 | Hulten |

FOREIGN PATENT DOCUMENTS

GB    2 074 950 A   * 11/1981   .............. 440/12.51

* cited by examiner

Primary Examiner—Sherman Basinger
(74) Attorney, Agent, or Firm—Michael A Mann; Nexsen Pruet Jacobs & Pollard LLC

(57) ABSTRACT

An amphibious vehicle having a hull that includes a pod formed in the bottom of the hull for receiving the engine and drive train. The pod is concave down with respect to the balance of the hull. Foam filled compartments formed lateral to the pod assure buoyancy and stability. Truck engine, transmission, suspension and control system components are carried by the hull and used to move the amphibious vehicle on land and, using the power take off of the engine to drive a marine propulsion system, on water as well. A first drive shaft, turned by the engine, extends through the hull to connect operatively with an axle and rotate front and rear sets of wheels. A second drive shaft runs from the engine through the hull wall to the marine propulsion system.

14 Claims, 5 Drawing Sheets

AMPHIBIOUS VEHICLE

1. Field of the Invention

The present invention relates generally to amphibious vehicles, that is, vehicles adapted to move on land and on water.

2. Background of the Invention

Amphibious vehicles are primarily known for their use in military operations, such as use in a beach assault or river crossing. These vehicles are highly specialized for carrying soldiers and materials in special circumstances. Commercial use of amphibious vehicles is also known. For example, an amphibious vehicle may be used for tours that take place primarily on water but may include a short drive on land.

Designing a vehicle that can operate on land and on water has obvious advantages but also requires the designer to overcome significant obstacles. For example, the propulsion system for operation on land and on water must be capable of meeting very different requirements. Driving on the road requires the capability to reach higher speeds and to overcome wind resistance and static and rolling friction of the wheels. Driving on water requires the propulsion system to operate at much lower speeds, to overcome water resistance, and to cope with the buffeting effect of water on the bow. Buoyancy and stability in the water, particularly in water that is not calm, is an additional important factor in the design of an amphibious vehicle. Finally, stability in operating at highway speeds or in cornering versus stability in the water impose very different constraints.

Less obvious than the different physical requirements the vehicles must meet are the different legal requirements that apply to vehicles that move on the highway versus those that move in the water, especially vehicles designed for hauling passengers. These legal requirements include such matters as the type of driver's license required for operation of the vehicle and special permits for wider or heavier vehicles.

Nonetheless, if a particular design is at least able to overcome the physical requirements, it can perform useful functions, not just in military applications but in commercial and other applications as well. For example, amphibious vehicles can be of significant importance in search and rescue operations following flooding of low-lying areas, and in traveling to areas where neither the roads nor the waterways lead everywhere, such as, for example, island chains separated by distances too great for bridges.

Various attempts have been made to design a suitable amphibious vehicle. For example, there is the amphibious vehicle described by Caserta et al., in U.S. Pat. No. 5,727,494. Their amphibian has the drive train mounted on top of two or three pontoons. It also has four retractable wheels powered from the rear of the vessel.

Another amphibious vehicle design is taught by Wardavoir, U.S. Pat. No. 5,410,980. Wardavoir describes the prior art approaches to designing an amphibious vehicle: adding a boat hull to a conventional motor vehicle and adding a terrestrial transmission to a conventional boat. His design focuses on producing a chassis that overcomes problems with these two prior art approaches, namely, by providing sufficient rigidity for land use yet being sufficiently light and balanced for use on water.

However, there remains a need for an amphibious vehicle that performs satisfactorily on land and on water.

SUMMARY OF THE INVENTION

According to its major aspects and briefly recited, the present invention is a vehicle capable of operation on a waterway and on a highway. In particular, the present invention is an amphibious vehicle having a hull mounted to components of a medium or heavy duty truck in such a way that the drive train of the truck is interior to the hull but the wheels, axles, breaks and suspension system of the vehicle are exterior to the hull. The hull has a channel or "pod" formed in it running parallel to and centered on the long dimension of the hull. The pod is dimensioned to receive the drive train including the radiator and, because of the location of the pod with respect to the balance of the hull, and the impact of placing the drive train in there on the center of gravity of the vehicle, it greatly improves the stability of the vehicle in water. The balance of the hull, located on either side of the pod and at a relatively higher elevation, is divided into sections and filled with foam.

A feature of the present invention is the shape of the hull in combination with the location of the drive train in it. Locating the drive train in the lowest part of the hull, indeed, in a pod below the balance of the hull, uses it as ballast for the hull. The shape of the hull with its pod, combined with the weight of the drive train, also allows it to act in a manner similar to that of the keel of a sailboat. With this arrangement, the vehicle is more stable in the water and on the road.

The combination of the pod and the foam-filled sides of the hull creates a boat that is unsinkable and even more stable in the event the engine compartment becomes flooded. The foam-filled sections flanking the pod are the equivalent of a pair of matched pontoons that, because of the existence of the foam, will not ship water even if the hull is breached. Because of the weight of the drive train, the pod rights itself no matter what forces are applied to capsize the hull.

Locating the drive train in the pod is another feature of the present invention because it makes it much easier to service and repair or replace the drive train. Furthermore, the shape and location of the pod allows both easier replacement of the drive train and the use of different truck engines.

These and other features and their advantages will become apparent to those skilled in hull design from a careful reading of the Detailed Description of Preferred Embodiments, accompanied by the following drawings.

DETAILED DESCRIPTION OF PREFERRED EMBODIMENTS

The present invention is an amphibious vehicle. In the preferred embodiment of the present invention, the vehicle, generally indicated by reference number 10, is illustrated for use as a tour boat. However, it will be understood that other uses are possible (and highly desirable) with minor modifications. Typically, for these other uses, the modifications will not affect the fundamental features of the present invention but are generally directed to how vehicle 10 is outfitted and equipped.

Figure 1:
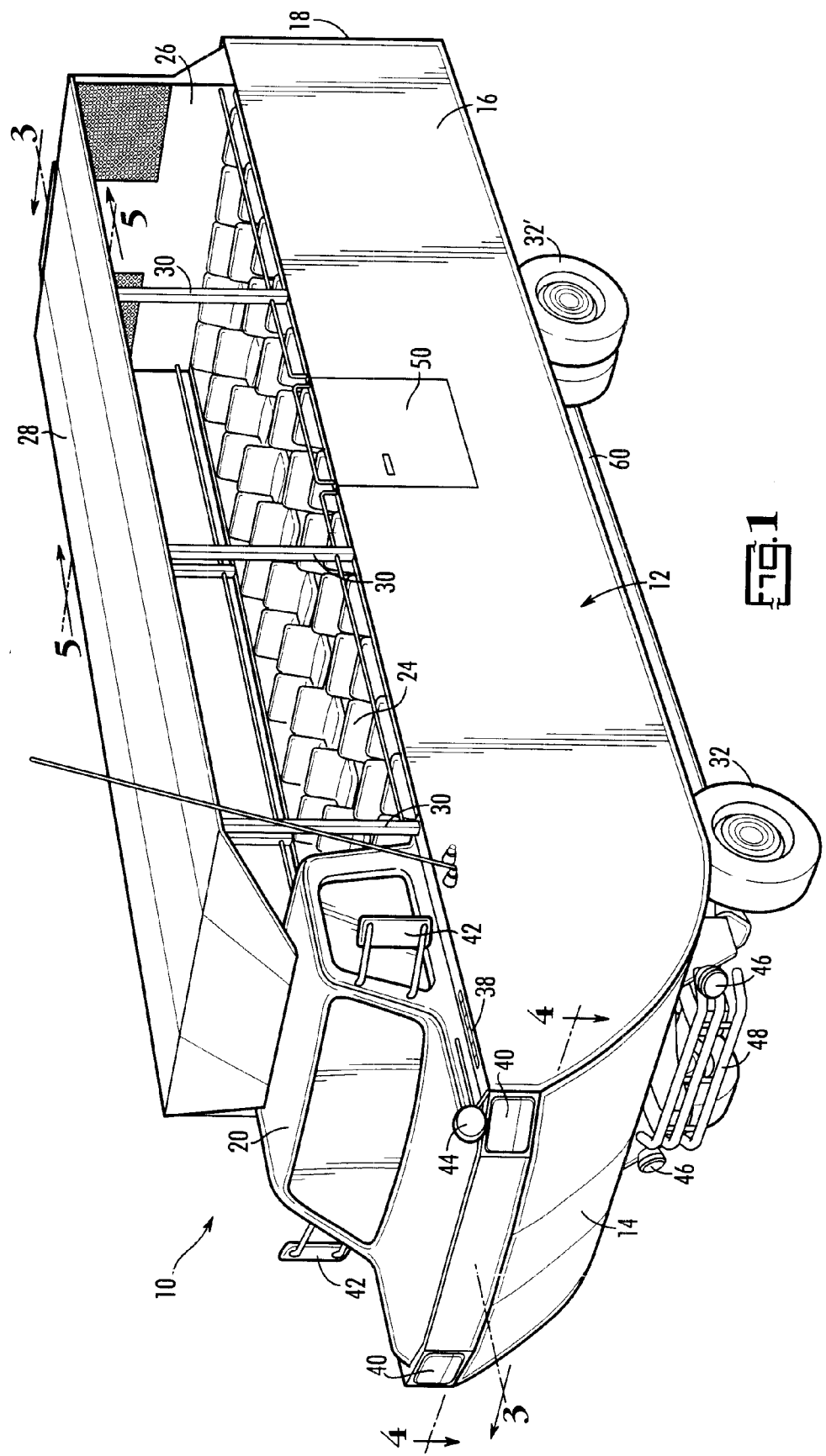
FIG. 1 is a perspective view of an amphibious vehicle on land, according to a preferred embodiment of the present invention.
Figure 2:
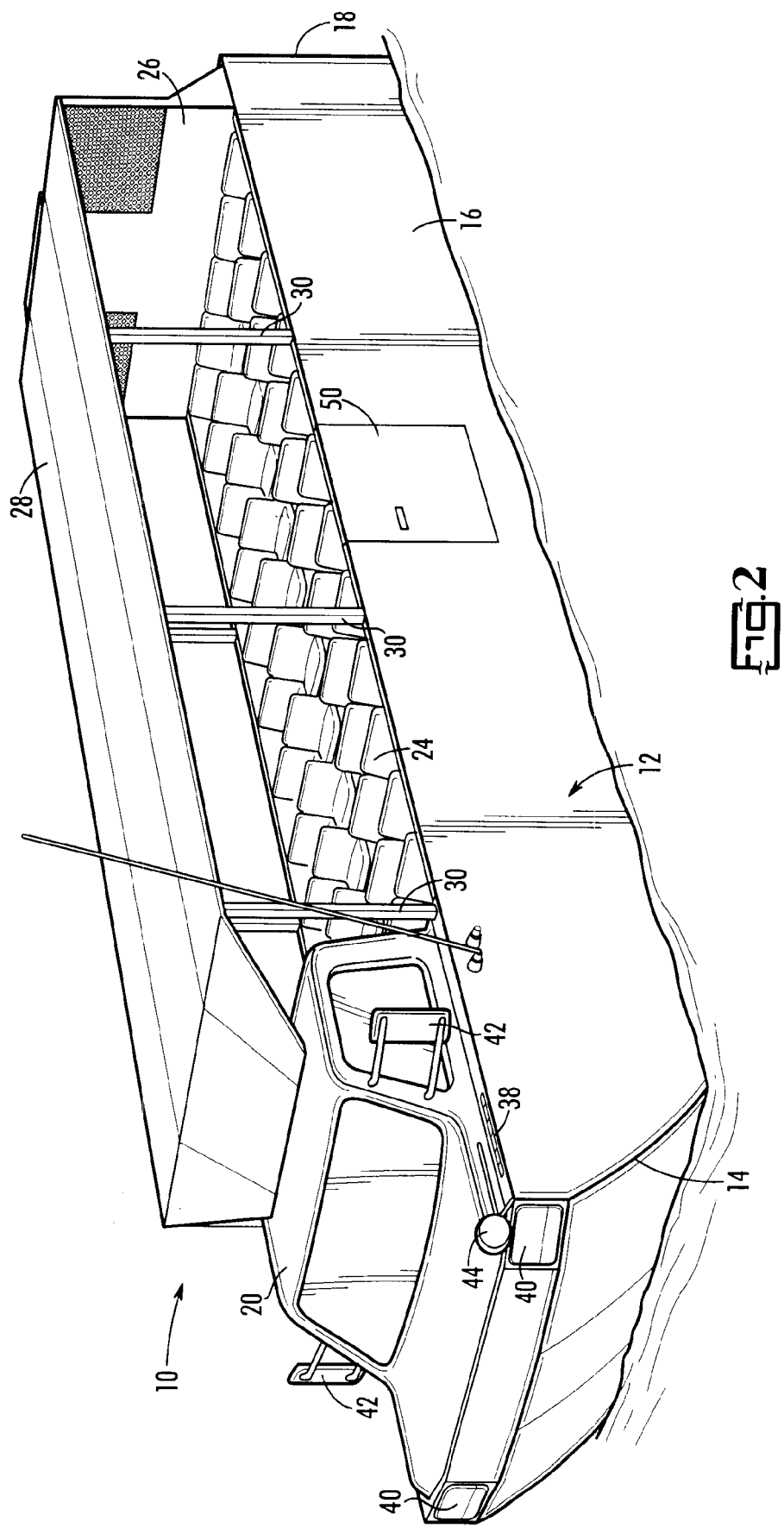
FIG. 2 is a perspective view of the amphibious vehicle of FIG. 1 on water.

Referring now to the figures, FIGS. 1 and 2 illustrate an embodiment of an amphibious vehicle 10, according to the present invention, that has been outfitted as a tour boat. FIG. 1 illustrates vehicle 10 on land; FIG. 2 shows the same vehicle 10 on water. Vehicle 10 has a hull 12 with a bow 14, sides 16, and a stern 18. Near bow 14 is a cabin 20 for the operator. Cabin 10 includes the controls one would expect to find in a roadworthy vehicle and in the cab of a truck in particular. These would include a steering wheel, gas and brake pedals, gear shift, and instrumentation.

Behind cabin 20 is a deck 22 on which are attached an array of seats 24. Deck 22 terminates with an end wall 26 at stern 18. Stretching from cabin 20 to end wall 26 is a canopy 28, supported by posts 30. Below hull 12 are a set of front wheels 32 and a set of rear wheels 32' operatively connected to axles 34, 34', respectively, so that they rotate therewith, and to suspension systems 36, 36', respectively (best seen in FIG. 3). In this configuration, vehicle 10 can nominally be 38 feet long and can transport two crew members and 45–49 passengers depending on the number and type of seats. Other configurations for vehicle 10 are possible, including longer and shorter, wider and narrower versions, and versions adapted for various uses. For example, a version of vehicle 10 outfitted as a recreational vehicle, with kitchen, bathroom, and other motor home amenities, can be and other motor home amenities, can be slightly longer, such as 45 feet. For search and rescue operations, deck 22 may be largely clear but have emergency medical equipment stowed in various shelves and cabinets. In the event vehicle 10 is outfitted in such a way that its overall weight requires, a second rear axle may be added to distribute the weight better.

Hull 12 and many of the structural components of vehicle 10 are preferably made of aluminum. The choice of aluminum is made to assure longer life than other metals that tend to corrode or than wood that tends to rot. Aluminum can also absorb more road stress than other marine type materials such as fiberglass.

Bow 14 is curved in two dimensions, up and to the sides, to lift vehicle 10 up and over waves and for directing water toward sides 16 for a smoother ride. Cabin 20 is outfitted much like any conventional vehicle, with driver's and mate's seats, seatbelts, padded dash, and airbags.

Other features of vehicle 10 include headlights 40, rear view mirrors 42, front mirror 44, parking lights 46 and bumper 48. A door 50 allows passengers to enter and exit vehicle 10. Door 50 is preferably fitted with a ladder (not shown) that pivots from a stowed position on deck to an in-use position where it is deployed over the side for descending from deck 22 to just above the water line or to a dock. Preferably, vehicle 10 has a door 50 on both sides, with at least one that is wide enough for utility loading and for access by those who are handicapped.

Figure 3:
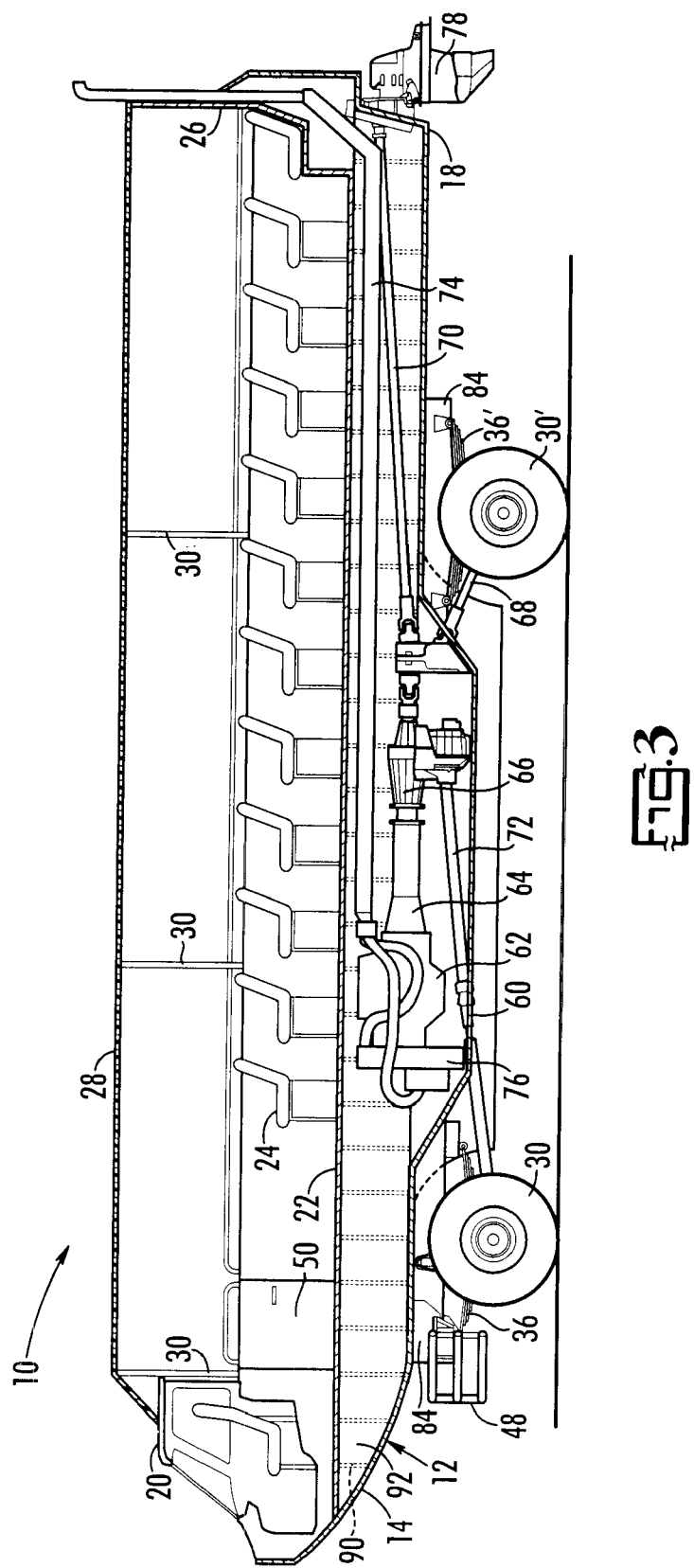
FIG. 3 is a side, cross-sectional view of the amphibious vehicle of FIG. 1, taken along lines 3—3 of FIG. 1.
Figure 4:
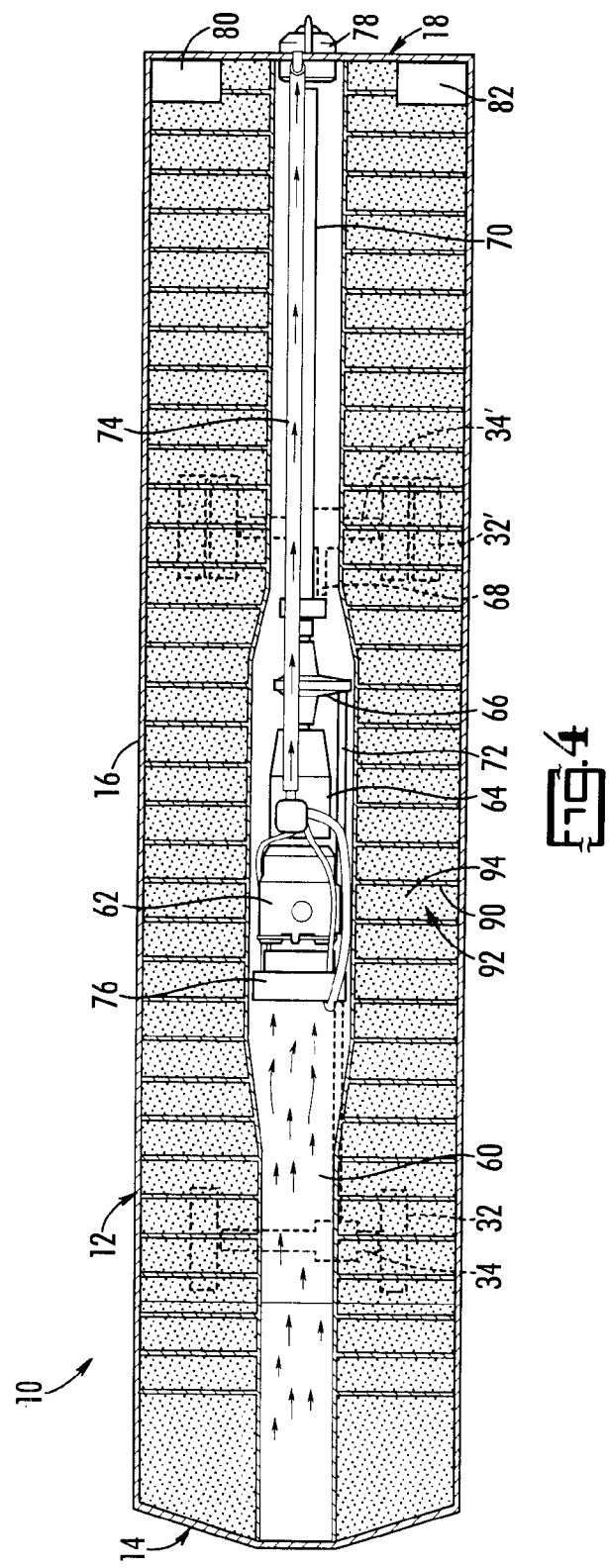
FIG. 4 is a top, cross-sectional view of the amphibious vehicle of FIG. 1, taken along lines 4—4 of FIG. 1.
Figure 5:
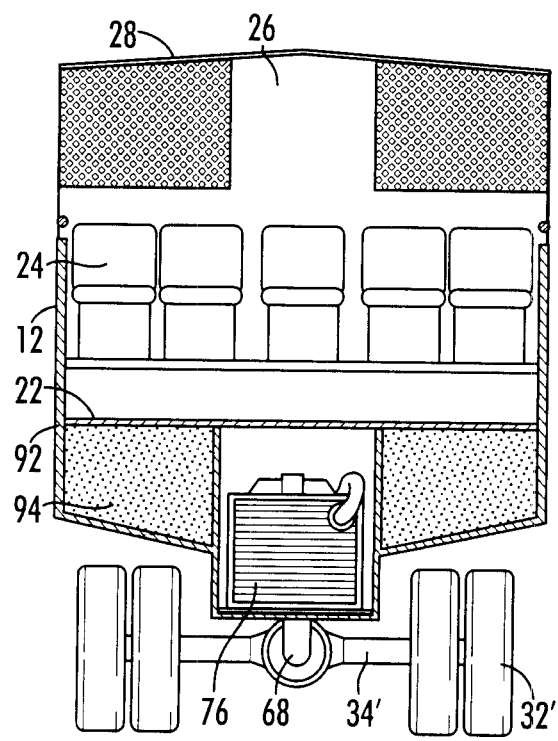
FIG. 5 is an end, cross-sectional view of the amphibious vehicle of FIG. 1, taken along lines 5—5 of FIG. 1.

FIGS. 3, 4 and 5 illustrate cross sectional views that reveal additional detail of the construction of vehicle 10. A pod 60 is formed in the bottom of hull 12 and is roughly centered fore to aft and port to starboard, running between front wheels 32 and rear wheels 32'. Pod 60 is formed to be concave downward, extending below the balance of hull 12 by a distance sufficient to allow room for at least a significant portion of an engine 62 and the related drive train components. These components include a transmission 64, a power take off or power splitting device 66, a first drive shaft 68, a second drive shaft 70 for maritime propulsion, a third drive shaft 72 for four wheel drive if desired, an engine exhaust pipe 74, radiator 76 and marine propulsion unit such as outboard engine 78. First, second and third drive shafts 68, 70 and 72 extend through sealed holes in hull 12. Pod 60 is dimensioned to receive engine 62 and the related drive train components but preferably has a generally rectangular cross section when viewed from the front of vehicle 10 and a long rectangular cross section with tapered ends when viewed from the side. The sides of pod 60 may be extended to provide vertical flanges 84 to which suspension systems 36, 36', can be bolted. Thus, pod 60 may be viewed as a deviation in the otherwise conventional shape of a boat hull. That deviation forms a compartment into which engine 62 and drive train components can be received so that they are, at least in major part, lower than the adjacent portions of hull 12 on either side of pod 60. Furthermore, as described below, it also acts as a keel.

Engine 62, the related drive train components and the control system components (those components needed for operating the engine and drive train, such as steering system, shifting, ignition system, instrumentation, brake system, etc.) are typical of those of medium duty and heavy duty trucks. Indeed, one of the important features of the present invention is that these components can be taken directly from medium duty and heavy duty trucks, either in the "after market" (used and reconditioned parts) or as original equipment. A related important advantage in the use of conventional truck components is that, when the user desires to replace the engine and related drive train components, a different engine and associated drive train components may be readily located and freely substituted. This is a significant advantage. An marine boat hull made of aluminum may last 50 years. A tour boat engine in daily use may last five years. Thus, in the lifetime of the hull 12, vehicle 10 may require ten engines and drive trains. Being able to gain access easily to the engine for repairs and change out reduces down time and the costs associated with the repair and change out task.

Pod 60 is vented so that air can be drawn in from the outside, preferably from vents 38 formed in bow 14 where bow 14 meets cabin 20. The air is channeled through ductwork into pod 60 toward radiator 76 for cooling engine 62 and supplying oxygen for engine combustion. A fuel tank 80 and battery 82 are stored in stern 18 on either side of outboard engine 78.

Outboard engine 78 is driven by a power splitting device 66 of engine 62 via second drive shaft 70. Power splitting device 66 is geared very low for power in moving through water rather than for high speeds. Rear wheels 32' are driven by first drive shaft 68 connected to a universal joint located in rear axle 34'. If four wheel drive is desired, third drive shaft 72 is coupled in a similar, conventional way to front axle 34.

In land mode operation, power is directed to the 2 wheel drive or, optionally, four wheel drive by operation of a selector transfer case transmission 64. Transmission 64 provides low and high speed shifting on the road. Power splitting device 66 is used to directly power the marine drive and still power the land drive with full horsepower. For the transition into water, the operator in cabin 20 drives into water from a ramp, engages marine transmission, and applies the throttle.

The marine drive can be propeller driven as shown or jet drive, but a 235 hp turbo diesel engine propeller driven marine drive is preferred. Conrad Marine, Inc., manufacturers such a drive, for example. With this size engine, highway speeds of 70 mph and top cruising speeds on water of 7 kph can be attained. Engine power is coupled to automatic transmission 64 and thence to first and second drive shafts 68, 70. Power is reversible to operate in reverse direction either on hand or in water or, when in the water and powered by jet drive, to clean debris out of jets. The drive for vehicle 10 should however be selected based on the use of vehicle 10. A feature of vehicle 10 is that it can accommodate many different drives.

Engine exhaust is vented through engine exhaust pipe 74 which runs from engine 62 to stern 18 and then up the outside of end wall 26.

Fore and aft of pod 60, outside of hull 12, are suspension systems 36, 36', which, like engine 62, can be taken directly from the suspension systems of conventional medium and heavy duty trucks and bolted to vertical flanges 84 to secure them to hull 12.

On either side of pod 60, hull 12 is divided into plural sections by bulkhead 90 that define individual, smaller compartments 92 and add rigidity to hull 12. Plastic foam 94 is formed in each compartment 92. Foam 94 will displace water and, because of its low density, will assure sufficient buoyancy so that vehicle 10 will float, even when hull 12 is breached in several places and the drain plugs removed to flood pod 60. Because the bottom floor of each compartment 92 is sloped toward pod 60, foam 94 will not stand in water. If any water is shipped, it will drain toward pod 60 and then be collected for ejection by a bilge pump (not shown).

The combination of the buoyancy of vehicle 10 and sides 16 gives the present vehicle approximately four feet of freeboard, enabling it to handle choppier water than other amphibious vehicles.

The use of the pod to carry engine 62 and the drive train components described above centers a major portion of the weight of the vehicle in the lowest point of hull 12. With foam-filled compartments 92 positioned lateral to pod 60 to assure buoyancy vehicle 10 is exceptionally stable. Indeed, because pod 60 is lower than the balance of hull (best seen in FIG. 5), the center of gravity of vehicle 10 is very low, even when carrying a full load of passengers. Furthermore, it will tend to right itself, even if capsized.

Vehicle 10 has greater stability than prior art amphibious vehicles because of the location of engine 62 and related drive train components in pod 60 below the balance of hull 12. The lower center of gravity increases payload and stability generally in a narrower, shorter hull footprint and without the need for ballast. (Stability would actually increase if the engine compartment were flooded.)

Placing radiator 76 in pod 60 just in front of engine 62 not only cools engine 62 but also isolates radiator 76 from the environment and thereby extends its life. Also, radiator 76 provides warm air flow through pod 60 that helps to evaporate water and prevent condensation.

Servicing and replacement of engine 62 and related drive train components is easier as well because of the design of pod 60. The bottom center portion of pod 62 is preferably at least 12" lower than the rear bottom of the hull and, with vehicle 10 raised, makes access to engine 62 through the wall of pod 60 relatively easy.

Figure 6:
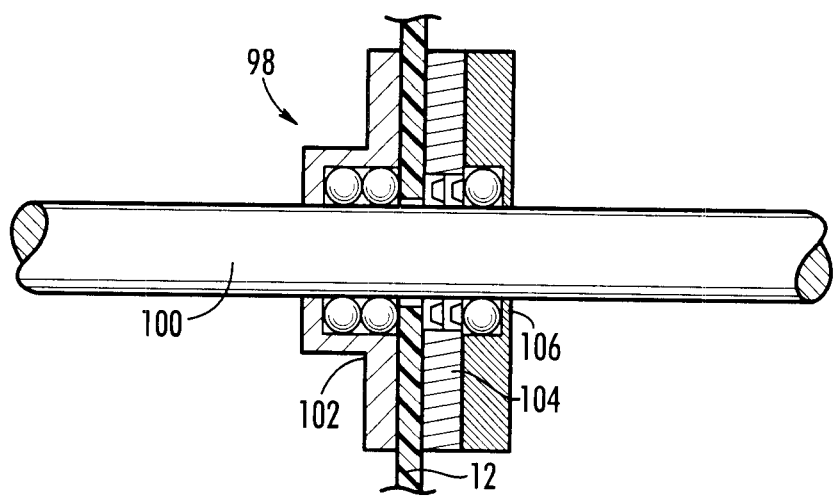
FIG. 6 is a detailed view of a seal bearing where hull is penetrated by a drive shaft.

Another feature of the present invention is the sealing of drive shafts 68, 70 and 72, to hull 12 (see FIG. 6). In each case, a block bearing 98 is used to mount the front end of a shaft 100 to hull 12. Tolerances are set close. A double seal is used at the exit of shaft 100 from hull 12: namely, a sealed bearing 102 outside hull 12, then a sealed plate 104 and another seal 106 at entrance to hull 12.

Because vehicle 10 is lighter than other amphibians, at least in part because the material of which hull 12 and many of its components such as bulkheads 90, are made of is aluminum, a smaller engine can be used. Driving requirements are frequently dependent on the size of the engine, becoming more restrictive with larger engines, and thus with the present invention in its preferred embodiment, drivers licensing requirements are simplified.

Because the width of the vessel can be kept small for a given loading of passengers, the vehicle does not require special permits to be operated over the highways. For example, the present invention is 8'6" wide and 38' long and therefore does not need an "overwidth" permit under various states' laws.

The pod design accommodates a variety of truck engine/transmission designs. A power train can be selected from among those readily available locally so that it meets local requirements for emissions, for example, so that local mechanics can work on it, and so that replacement parts are readily available.

Canopy 28 of vehicle 12 when used as a tour boat can be made of clear polycarbonate sheeting, sold under the trademark LEXSAN, glazed with a smoke coloring for shade.

It will be apparent to those skilled in the art of amphibious vehicle design that many modifications and substitutions can be made to the foregoing preferred embodiment without departing from the spirit and scope of the present invention, which is defined by the appended claims.

What is claimed is:

1. An amphibious vehicle, comprising:

a hull having lateral compartments;

a pod formed in said hull between said lateral compartments and extending convexly downward of said hull below said lateral compartments, said pod having a generally rectangular cross section extending below said lateral compartments, said pod having a first hole formed therein, and said hull having a second hole formed therein;

an engine carried in said pod;

a first drive shaft carried in said pod, coupled to said engine and extending through said first hole in said pod;

a second drive shaft carried in said hull, coupled to said engine and extending through said second hole in said hull;

a radiator carried in said pod and located proximate to said engine;

flotation means carried in said lateral compartments;

a first axle carried by said hull and attached to said first drive shaft;

a second axle carried by said hull, said second axle being spaced apart from said first axle;

wheels rotatably carried by said first and second axles, said pod being located between said wheels and said first and said second axles so that said engine is carried between said wheels and said first and said second axels;

marine propulsion means carried by said hull and attached to said second drive shaft; and control means for operating said engine.

2. The amphibious vehicle as recited in claim 1, wherein said pod is vented to receive air for combustion of fuel by said engine and for expelling combustion gases.

3. The amphibious vehicle as recited in claim 1, wherein said hull is made of aluminum.

4. The amphibious vehicle as recited in claim 1, wherein said engine is a truck engine.

5. The amphibious vehicle as recited in claim 1, wherein said engine is a 235 horsepower turbo-diesel engine.

6. The amphibious vehicle as recited in claim 1, further comprising a deck containing an array of at least 45 chairs.

7. The amphibious vehicle as recited in claim 1, wherein said hull is between 38 and 45 feet long.

8. The amphibious vehicle as recited in claim 1, wherein said lateral compartments have floors that slope toward said pod.

9. The amphibious vehicle as recited in claim 1, wherein said flotation means is plastic foam.

10. The amphibious vehicle as recited in claim 1, wherein said hull has a bow and wherein intake vents for said pod are located in said bow of said hull.

11. The amphibious vehicle as recited in claim 1, further comprising a deck having an array of chairs thereon; and a canopy over said deck.

12. An amphibious vehicle, comprising:

a hull;

a pod carried by said hull and extending convexly downward of said hull below said hull, said pod having a generally rectangular cross section extending below said hull, said pod having a first hole formed therein;

an engine carried in said pod;

a first drive shaft carried in said pod, coupled to said engine and extending through said first hole in said pod;

a radiator carried in said pod and located proximate to said engine;

a first axle carried by said hull and attached to said first drive shaft;

a second axle carried by said hull, said second axle being spaced apart from said first axle;

wheels rotatably carried by said first and second axles, said pod being located between said wheels and between said first and said second axles; and control means for operating said engine.

13. The amphibious vehicle as recited in claim 12, wherein said hull has a bow and wherein said bow has vent means formed therein for allowing air to enter said pod.

14. The amphibious vehicle as recited in claim 12, wherein said hull has a second hole formed therein and wherein said amphibious vehicle further comprises:

a second shaft coupled to said engine, said second shaft extending though said second hole; and marine propulsion device in operative connection with said second shaft.

* * * * *